United States Patent
Morehead (10) Patent No.: US 11,676,058 B2
(45) Date of Patent: Jun. 13, 2023

(54) SYSTEM AND METHOD FOR ARTIFICIAL INTELLIGENCE

(71) Applicant: Graham Morehead, Woodbridge, VA (US)

(72) Inventor: Graham Morehead, Woodbridge, VA (US)

( * ) Notice: Subject to any disclaimer, the term of this patent is extended or adjusted under 35 U.S.C. 154(b) by 349 days.

(21) Appl. No.: 17/011,774

(22) Filed: Sep. 3, 2020

(65) Prior Publication Data

US 2022/0067562 A1 Mar. 3, 2022

(51) Int. Cl.
*G06N 10/00* (2022.01)
*G06F 1/08* (2006.01)
*G06F 9/54* (2006.01)

(52) U.S. Cl.
CPC ............. *G06N 10/00* (2019.01); *G06F 1/08* (2013.01); *G06F 9/54* (2013.01)

(58) Field of Classification Search
CPC ....................................................... G06N 10/00
USPC ........................................................ 706/62
See application file for complete search history.

(56) References Cited

U.S. PATENT DOCUMENTS

2017/0177534 A1* 6/2017 Mohseni ............. G06F 13/4068

* cited by examiner

*Primary Examiner* — Tomi Skibinski
(74) *Attorney, Agent, or Firm* — Law Office of Jerry Joseph, PLC; Jerry K. Joseph (57) ABSTRACT

An artificial intelligence system within a network including a plurality of interconnected nodes including a first node and a second node, containing a set of interconnected nodes, a "network," in which some nodes are externally connected, and all nodes are connected to a subset of the other nodes in such a way that the output channel of one node is connected to the input channel of another via a two-way connection, and where each node has access to the system clock, and has a classical computer (CC), and has a quantum computer (QC), and has one or more input channels, each capable of sending or receiving signals, and has one or more output channels, each capable of sending or receiving signals, and can perform a quantum computation cycle.

19 Claims, 8 Drawing Sheets

SYSTEM AND METHOD FOR ARTIFICIAL INTELLIGENCE

BACKGROUND OF THE INVENTION

1. Field of the Invention

The present general inventive concept relates to systems and methods of artificial intelligence, and more particularly to systems and methods of combining classical computers and quantum computers to provide artificial intelligence.

2. Description of Related Art

Number Theory refers to a body of mathematical work including the work of Peano and others. From this work we have a consistent model of numbers and what they represent. Set Theory refers to a body of mathematical work including the work of Cantor, Zermelo, Frankel, and others. Graph Theory refers to a body of work including the work of Euler, Cauchy, and L'Huilier, and leads directly to the study of Topology. Computation Theory and Information Theory refer to a body of mathematical work which builds on Number Theory and Set Theory, and includes the work of Turing, Church, Godel, Shannon, and many others. Quantum Mechanics refers to a body of work in Physics including contributions from Feynman, Bohr, Fermi, Pauli, Schrödinger, Penrose, Plank, Einstein, Heisenberg, Born, and many others. Cognitive Science and Neuroscience include the work of Pinker, Jerry Fodor, Penrose, Stuart Hameroff, and many others. Complexity Science refers to a body of work including that of Herbert Simon, Stuart Kaufmann, E. O. Wilson, Jane Jacobs, James A Wilson, Elinor Ostrom, Conway, Wolfram, Ilya Prigogine, Friedrich Hayek, and many others. The description below will draw from these bodies of work. The person or team skilled in the above-referenced fields will have sufficient knowledge to understand this disclosure.

Automata, deterministic and nondeterministic, are theoretical machines used to demonstrate how computers work. Classical computers (CC), what the layman might simply call "computers," are comparable to a class of automata referred to as deterministic Turing Machines (DTM). It was thought by some that quantum computers would be comparable to non-deterministic Turing Machines (NTM), but there is no convincing argument as yet. The NTM, if it could be built physically, would be a universal computer—able to run any program. A universal computer is precisely a device able to compute the same set of functions as a Turing Machine. It is clear that quantum computers have a set of capabilities that far exceed those of classical computers [Arute et al., 2019], but their capabilities and the problems at which they excel will depend on the configuration. There exists, as yet, no operationally successful design for a universal quantum computer. It is expected that near-term usage of quantum computers will mimic the current use of GPUs, in that they are considered external special-use processors, always controlled by more conventional processors.

Therefore, what is desired is a hybrid system combining classical and quantum computing components into a novel system and configuration.

SUMMARY OF THE INVENTION

The present general inventive concept provides a novel configuration of classical computation devices combined and quantum computation devices, and a set of methods for operation and improvement of the quantum Artificial Intelligence (AI) system.

The present general inventive concept also provides systems and methods for quantum AI which include the following principles: the AI systems will employ a plurality of quantum computers embedded in a classical computing framework, wherein each quantum computer is programmed by a local classical computer (CC). After a quantum computation cycle is performed by the quantum computer, each quantum computer will provide output to that classical computer.

The present general inventive concept also provides an AI system that is designed and/or configured to decompose a larger problem into a plurality of smaller problems to be solved. Each node of the AI system formed as a network will become a solver of a smaller problem of the decomposed larger problem.

Features and/or utilities of the present general inventive concept may be achieved by providing an artificial intelligence node including a classical computer, an input channel and an output channel in communication with the classical computer, and a quantum computer in two-way communication with the classical computer.

The classical computer may be configured to direct operations of the quantum computer.

The classical computer may be configured to communicate with an external controller.

The external controller may include a system clock.

A timing of at least one of the classical computer and the quantum computer may be coordinated using the system clock of the external controller.

The quantum computer may be configured to process computations determined difficult for the classical computer.

Features and/or utilities of the present general inventive concept may also be achieved by providing an artificial intelligence system network including a plurality of nodes interconnected as a network, wherein each node includes a classical computer, one or more input channels and one or more output channels in communication with the classical computer, both the input and output channels configured to send and receive signals, a quantum computer in two-way communication with the classical computer, and a controller in two-way communication with the network and configured to facilitate a communication between a user and the network, wherein the user programs the controller, the controller configures the classical computer in each node, and the classical computer in each node configures the quantum computer in the same node to perform a quantum computation cycle.

The controller may include a system clock.

Each node may be in communication with the system clock.

Each node may be configured to perform a quantum computation cycle in each timestep including receiving signals processed by the classical computer, configuring a quantum circuit disposed within the quantum computer by the classical computer, the quantum circuit operating on qubits, performing a measure operation on the qubits, transmitting result of the measure operation directly to the one or more output channels.

Each node may be configured to perform a quantum computation cycle in each timestep, the quantum computation cycle including the classical computer processing signals from the one or more input channels and the one or more output channels, the classical computer configuring a quantum circuit, the quantum circuit operating on the qubits, the quantum computer performing a measure operation on the qubits, the quantum computer sending a result of the measure operation to one of the one or more output channels and the classical computer for processing, and the classical computer sending signals to at least one of the one or more input channels and the one or more output channels.

The classical computer within at least one node may be configured to transmit a first signal through a first channel after a quantum computation cycle, receive a second delta signal through the first channel representing a delta between the first signal and a third expected signal, and alter a state to minimize the second delta signal.

Each node of the plurality of nodes may be configured to use bits to represent vectors in both the state spaces U of upstream nodes and the state spaces D of the downstream nodes.

Each node of the plurality of nodes may be configured to use bits to represent a current state $d \in D$ of any downstream node, and the current state $u \in U$ of any upstream node.

Each node of the plurality of nodes may be configured to use bits to represent a set of functions $f:(u,d) \rightarrow d'$, where $d' \in D$.

Each node of the plurality of nodes may configure the quantum computer such that at least one possible value of d' can be represented in qubits by using values of u and d as inputs to $f$.

Each node of the plurality of nodes may execute a measure operation on the qubits such that a single d' can be output for any downstream node.

The state spaces U and D may include graph spaces.

Features and/or utilities of the present general inventive concept may also be achieved by providing a computer-implemented method including forming a network of a plurality of interconnected nodes, wherein each node comprises a classical computer, one or more input channels and one or more output channels in communication with the classical computer, wherein both the input and output channels configured to send and receive signals, and a quantum computer in two-communication with the classical computer, wherein the classical computer configures the quantum computer to perform a quantum computation cycle, computing an importance, using the classical computer, of each input channel using a plurality of methods including ablation and correlation, attenuating, using the classical computer, each input channel determined less important, amplifying, using the classical computer, each input channel determined more important, and disconnecting, using the classical computer, each input channel below a predetermined level of importance.

For a given node X, when all of node X's outputs have been disconnected by nodes downstream of node X or fall below a predetermined threshold of importance, node X may disconnect from the network.

Features and/or utilities of the present general inventive concept may also be achieved by providing method of improving an artificial intelligence system, the artificial intelligence system including a plurality of nodes interconnected as a network, wherein each node includes a classical computer, one or more input channels and one or more output channels in communication with the classical computer, both the input and output channels configured to send and receive signals, a quantum computer in two-way communication with the classical computer, and a controller in two-way communication with the network and configured to facilitate a communication between a user and the network, wherein the classical computer configures the quantum computer to perform a quantum computational cycle, the method including finding, using the controller, a set N of distinct unconnected nodes having output channels with correlated signals, connecting, using the controller, the set N nodes to afford intercommunication, and altering, by each node in the set N nodes, the classical computer internal to the node according to a goal including minimizing a number of duplicate computations, maximizing signal robustness, and maximizing coding efficiency.

Additional aspects of the present general inventive concept will be set forth in part in the description which follows and, in part, will be obvious from the description, or may be learned by practice of the general inventive concept.

BRIEF DESCRIPTIONS OF THE DRAWINGS

These and/or other aspects of the present general inventive concept will become apparent and more readily appreciated from the following description of the embodiments, taken in conjunction with the accompanying drawings of which.

DETAILED DESCRIPTION OF INVENTION

A glossary list of terms defining their meaning as intended within the present application, unless defined otherwise, is presented below.

timestep: A fixed time interval.
bit: A mathematical unit with only two states, representable by 0 and 1; AKA a "classical bit."
signal: A finite amount of information, typically represented by a set of bits, integers ("ints"), or floating points ("floats"). An absence of information during a timestep is itself also a signal.
tuple: An ordered set of information, typically represented with a comma-delimited sequence of elements between parentheses, e.g. "(1, 2, 3, 4, 5)". The order is typically meaningful.
vector: A special case of a tuple, where all elements are of the same type, typically ints or floats.

n-vector: Where "n" is a number, this is a vector having n elements.

Bloch sphere: A unit sphere. It is often used in quantum computing discussions. The "north" pole is associated with a classical 0, and the "south" pole is associated with a classical 1. Other points on the surface of the sphere represent the other quantum states of a qubit.

qubit: A mathematical unit of quantum information, affording states 0, 1, and any other state representable by a point on the surface of the Bloch sphere. The location of such a point is indicated with two angles: $\phi$ and $\theta$.

measure operation: A physical observation of any quantum state resulting in the collapse of the wave function. When a qubit is subjected to a measure operation, it is forced into a 0 or 1 state, representable by a classical bit.

Turing machine: A theoretical machine devised by Alan Turing. The precise mathematical definition can be found in the literature. It is foundational to the field of Computer Science and is used to define the classical terms "computer" and "computation."

classical computation: Any function that can be performed by a Turing machine.

classical computer (CC): A computer. In contrast to a quantum computer, a CC has neither qubits nor quantum gates. A CC can be constructed according to an architecture including but not limited to von Neumann and Harvard. The set of functions that can be implemented on a CC is precisely those which are computable by a Turing machine.

quantum gate: The building block of a quantum circuit. Quantum gates can be considered analogous to classical logic gates in a conventional digital circuit. Quantum gates are often represented by unitary matrices. Quantum gates include but are not limited to Pauli, Hadamard, phase, swap, CNOT, Ising, Fredkin, Deutsch, and Toffoli gates.

Pauli gate: A quantum gate equivalent to a rotation around one of the Bloch axes (X, Y, or Z).

Hadamard gate: A quantum gate equivalent to a 180-degree rotation around the diagonal X+Z axis of the Bloch sphere.

phase gate: A quantum gate equivalent to a rotation around $\phi$.

swap gate: A quantum gate which swaps the states of two qubits.

CNOT gate: The Controlled NOT gate. A quantum gate that operates on two or more qubits. One qubit is designated as the control qubit. If the control qubit is in the 1 state, it performs the NOT operation on the other qubits.

Ising, Fredkin, Deutsch, and Toffoli gates: Other types of quantum gates described in the literature.

arbitrary rotation: Movement of an arbitrary point A on the Bloch sphere to an arbitrary point B on the sphere. For any such movement, there exists an angle $\alpha$ and an axis (X, Y, Z or some linear combination thereof), such that the axis can be defined and a rotation of $\alpha$ around that axis will bring point A to B. By linear algebra, there exists a combination of the quantum gates enumerated above to effectuate any arbitrary rotation.

qubit flip: A special case of a rotation where a qubit is in either the 0 or 1 state and is rotated to be in the opposite state.

qubit reset: The use of a measure operation and, if necessary, qubit flips, to set qubits to the 0 state.

quantum circuit: A configuration of quantum gates which specifies what gates operate on which qubits and in what order. The quantum circuit can be said to "operate" on a set of qubits. Quantum circuits can be configured serially.

quantum computation: A quantum circuit operating on qubits.

quantum computation cycle: A quantum computation preceded by a qubit reset and followed by a measure operation.

ablation: A method for determining the importance of each input to a system. One by one, each input is removed, i.e. "ablated", and the outcome is analyzed. Then that input is put back. The importance of each input can be ranked by the degree of difference produced by its ablation.

signal robustness: A system carries a signal "robustly" if propagation of the signal can continue despite some communication failures coding efficiency: Given a signal S that encodes some number X of meaningfully-distinct states, the coding efficiency of S is X divided by the length of S.

upstream/downstream node: If an output channel of node A is connected to the input channel of node B, then B is "downstream" of A. A is "upstream" of B.

graph: A mathematical construct involving vertices (drawn like points or nodes) and edges (drawn like lines between the points. Each vertex may have attributes and any edge may have attributes or a one-way direction.

$\in$: Element of, e.g. Given the set S of even integers, $8 \in S$.

cartesian product: The product of two sets. The cartesian product of sets X and Y is the set that contains all ordered pairs (x, y), where $x \in X$ and $y \in Y$.

$f:(A,B) \rightarrow C$: Description of the function $f$, indicating that it takes inputs from sets A,B, and generates outputs in the set C, e.g. Given the set S of even integers, and given $f(x,y)=x+y$, we can say: $f(S,S) \rightarrow S$.

state space: Typically a Euclidean vector space, and typically infinite, but can be any set of real numbers or integers or vectors composed thereof.

graph space: A possibly infinite set of potential graphs. Typically, the cartesian product of all possible node types and all possible edge types and all possible ways the nodes could be connected by the edges.

natural language generation: A process, typically performed by sophisticated software and hardware, that generates strings of text that appear to be coherent and meaningful. The process may or may not be initiated by a specified meaning which the text should convey.

Further, any reference in the claims to an electronic signal or an electromagnetic signal (or their equivalents) is to be understood that in an embodiment the signal is a non-transitory electronic signal or a non-transitory electromagnetic signal. If the signal per se is not claimed, the reference may in some instances be to a description of a propagating or transitory electronic signal or electromagnetic signal.

Unless otherwise explicitly recited herein, any reference to "record" or "recording" is understood to refer to a non-volatile or non-transitory record or non-volatile or non-transitory recording.

Recording the results from an operation or data acquisition, for example, recording results such as an electrical signal having a particular frequency or wavelength, or recording an image or a portion thereof, is understood to mean and is defined herein as writing output data in a non-volatile or non-transitory manner to a storage element, to a machine-readable storage medium, or to a storage device. Non-volatile or non-transitory machine-readable storage media that can be used in the present general inventive concept include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read many optical storage disks), and CD-RW disks (i.e., re-writeable optical storage disks) and electronic storage media, such as RAM, ROM, EPROM, Compact Flash cards, PCMCIA cards, or alternatively SD or SDIO memory and the electronic components (e.g., floppy disk drive, DVD drive, CD/CD-R/CD-RW drive, or Compact Flash/PCMCIA/SD adapter) that accommodate and read from and/or write to the storage media.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer, in either one or a plurality of locations.

General purpose programmable computers useful for controlling instrumentation, recording signals and analyzing signals or data according to the present description can be any of a personal computer (PC), a microprocessor-based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general-purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware, and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

This configuration is designed to solve problems related to pattern recognition and pattern generation related to various fields including but not limited to visual data, spatial data, natural language, and arbitrary mathematical problems. It will not solve all problems in these fields but will, as in the case of the work by Arute et al., solve some problems faster than is possible with classical computers alone. Quantum computers (QC) excel at representing combinatorial explosions, i.e. situations where one or more cartesian products of sets generates so many possibilities that there aren't enough classical bits even to represent them, much less a sufficient amount of classical computation power to process them. The field of quantum computers is still new, and the currently available components are so noisy that the capabilities of such a device within the next two decades is not completely knowable. In this disclosure we will limit ourselves to the understanding of a QC as it exists now, with the addition that QCs are expected to include more qubits in the future, and those qubits will be configured, read, and operated on with lower and lower noise as the technology improves.

An approach to quantum computing, spearheaded by D-Wave, uses qubits to solve certain kinds of optimization problems. Such problems are those which map onto an optimization strategy called "simulated annealing." These are not universal computers and do not afford quantum gates, but they still may solve many problems and could therefore have an impact in the future quantum computing market. This disclosure will not focus on this type of QC. A more common approach to quantum computing involves representing qubits with the spin states of electrons. IBM and Rigetti are following this approach. This approach is currently feasible. While still very noisy, such systems exist and are available for anyone to use in the cloud. They are expected to become less noisy and cheaper in the future.

A much more difficult approach involves non-abelian anyons, AKA Majorana Fermions. AKA "Topological Quantum Computing." This is the Microsoft approach. The anyon particles are braided with each other through time. The measure operation outputs a 1 for any two anyons that are braided and a 0 if not. Microsoft has been pursuing this approach for approximately 24 years. Majorana Fermions have been observed so we can be sure they exist. Whether or not they can be used in the desired manner is still to be seen. If successful, Microsoft's quantum computer could theoretically exhibit less than 0.1% of the noise seen in the more conventional strategies used by IBM and Rigetti.

Any of the above approaches could be incorporated into the disclosed invention, but the strategies sought by IBM, Rigetti, and Microsoft hold the most promise and these approaches will be in mind in the description when referring to quantum computation devices or computers. The disclosed invention requires a plurality of quantum computers. Each can be small or large, but each quantum computer will be treated hereon as a modular component, able to be arbitrarily combined with other such components as well as components of other kinds.

Quantum Computing and the Brain

For most of the last 100 years it was believed that quantum effects are only coherent at very cold temperatures. In the last 10 years a number of biological processes have been found to use quantum processes. These effects obviously occur at body-temperature for the lifeforms involved. These include plants which use quantum tunneling for photosynthesis, and birds which use quantum entanglement to sense the Earth's magnetic field. If these effects have been seen in other creatures, might they exist in humans?

Sir Roger Penrose is one of the world's foremost theoretical physicists and separately also one of the world's foremost mathematicians. Along with Dr. Stuart Hammeroff, an anesthesiologist, they have proposed Orchestrated Objective Reduction Theory (OrchOR), which states, among other things, that quantum effects are utilized in the brain. OrchOR can be researched externally to this document. From here on it will be assumed that the reader is conversant in this theory.

OrchOR indicates that the oft-taught Copenhagen interpretation of quantum wave collapse is incorrect. The Penrose interpretation turns this on its head. According to Copenhagen an observer must make an observation before a quantum wave will collapse. According to Penrose, waves collapse spontaneously when the difference between two possibilities crosses a threshold equal approximately to one graviton. This collapse is a "pixel" of protoconsciousness. If enough of these are collected and organized in the "right" way, consciousness emerges. Nobody has thus far put forth a theory to describe the "right" way.

The claims in this filling were designed to mimic the structure of pyramidal neurons and their configuration in the human brain. The aim is to enable AI in the quantum age. If Penrose and Hammeroff are correct, such a system may also enable artificial consciousness, not just intelligence.

The human brain is composed (according to the research of Jeff Hawkins, the Redwood Institute, and others) of numerous "cortical columns," each an approximately columnar volume within the neocortex, which, under this rubric, can be thought of as a flat sheet having some thickness. At birth, one could theoretically take a cortical column from one place in the brain and put it anywhere and it should operate similarly. The audio centers process audio because they are connected to the ears, not because they were better at audio than were the other cortical columns. A cortical column is a modular piece of biological hardware repeated again and again—and these are what comprise the neocortex. There are unique attributes of human cortical columns over any other primate or creature, and even unique neuron types such as rose-hip neurons.

Strangely, cortical columns are structured antithetically to how modern AI systems are structured. Current neural networks and other "deep" systems almost all use something like a Restricted Boltzmann Machine (RBM). These systems have a high number of connections (i.e. millions) between the artificial neurons of different layers, and typically zero connections between the neurons within a layer. Biological cortical columns appear to be the opposite, having very few connections between layers, and many connections within a layer. There are also additional features, such as voting connections which help one cortical column coordinate with other columns with regards to its guesses about the state of the world around us.

Research into cortical columns has also indicated that not all neuronal activity initiates a neuronal firing event, but this does not mean that such activity is ignored. Some inputs to a neuron will change that neuron's probability of firing at some later state. No one understands these findings. The questions inherent in our biology have led this inventor to some conclusions about one way to implement AI in quantum computers.

Many brain processes and many important problems in computer science are related to time sequences. Consider the fact that your audio centers are so sensitive to differences in time that you can tell when a sound is coming from the left versus the right because of when the sound wave hits each ear. When you are playing music and the playing of said music stops for a few milliseconds, it is almost jarring. Our brain has sophisticated methods for modeling and recognizing time sequences. In the realm of physical movement, it has been shown that infants are aware that a falling ball should move according to Newton's equations. When it is artificially made to move some other way, the infant notices.

One of the claims in this filing assumes a fully realized embodiment of U.S. Pat. No. 9,940,321, "System for Machine Translation." The Marked-lemma Dependency Trees (MDTs) referenced therein comprise a mathematical construct for semantic modeling. A sentence having one clear understanding can be represented by one MDT, whereas a double-entendre requires two MDTs. See the patent in question for more details. It is conjectured that MDTs can provide a scaffold for automated linguistic reasoning by representing meanings in discrete mathematical forms. The possibly infinite combinations of these forms and how they might interact are challenging to classical computers. It is conjectured that quantum computers will enable efficient exploration of the space of possible combinations.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The present general inventive concept provides a novel configuration of classical computation devices combined and quantum computation devices, and a set of methods for operation and improvement of the quantum Artificial Intelligence (AI) system.

The systems and methods for quantum AI provided by the present general inventive concept include the following principles: the AI systems will employ a plurality of quantum computers embedded in a classical computing framework, wherein each quantum computer is programmed by a local classical computer (CC). After a quantum computation cycle is performed by the quantum computer, each quantum computer will provide output to that classical computer directly connected to the quantum computer.

According to the present general inventive concept, the AI system overall will decompose a larger problem into a plurality of smaller problems to be solved. Each node in the network will become a solver of a smaller problem of the plurality of smaller problems to be solved.

The plurality of nodes includes some nodes that are configured to solve a problem of how to compose solutions of the smaller problems. In this way, each node will become successful at modeling "implicit knowledge," in which a program or a brain function is able to perform some task without being able to describe how. For instance, parts of the human brain and the human nervous system are black boxes but work quite efficiently. Consider the leg design of a cockroach. Robotic experiments have shown that their legs are designed to robustly and rapidly handle highly irregular terrain with almost no neuronal alterations to the signals being sent to those legs. There is, in that sense, intelligence implicit in the design of cockroach legs. Similarly, each quantum computer disposed within a virtual brain could be internally configured or primed to easily perform a specific quantum computation.

Figure 1:
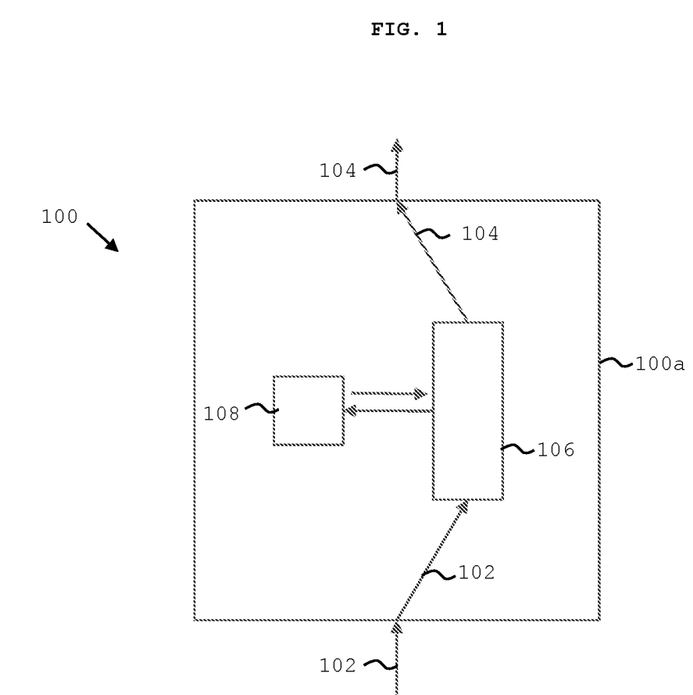
FIG. 1 illustrates a schematic block diagram of an artificial intelligence system according to an example embodiment of the present general inventive concept.

FIG. 1 illustrates a schematic block diagram of an artificial intelligence system 100 according to an example embodiment of the present general inventive concept. FIGS. 2A through 2D are schematic block diagrams of nodes of an artificial intelligence system according to example embodiments of the present general inventive concept.

Figure 2A:
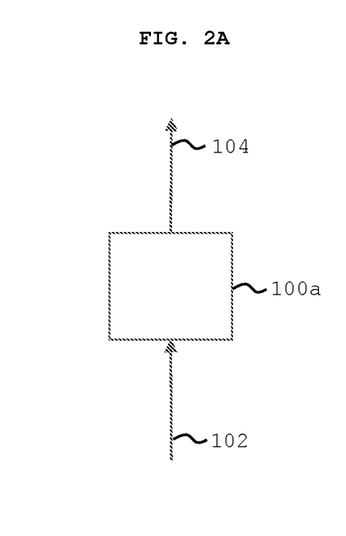
FIGS. 2A through 2D are schematic block diagrams of nodes of an artificial intelligence system according to example embodiments of the present general inventive concept.
Figure 2B:
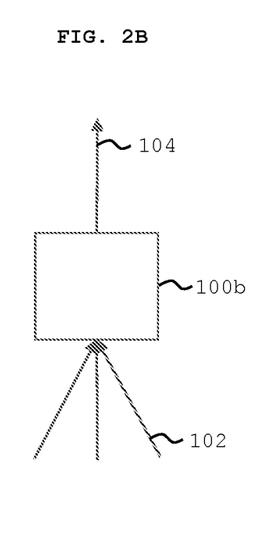
Figure 2C:
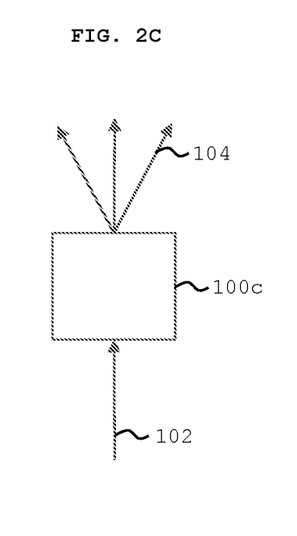
Figure 2D:
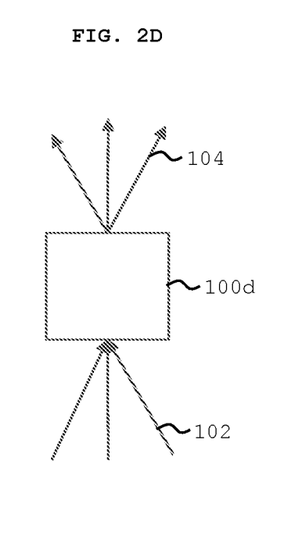

Referring to FIGS. 1 through 2D, the artificial intelligence system, designated generally as 100, is illustrated.

In the present embodiment, the artificial intelligence system 100 includes a node 100a having an input channel 101 and an output channel 102. However, the present general inventive concept is not limited thereto.

That is, in alternative embodiments, the artificial intelligence system 100 may include various other nodes 100a, 100b, 100c, 100d which have one or more input channels 101 and one or more output channels 102.

In the present embodiment, referring now to FIG. 1, each node 100a of the artificial intelligence system 100 includes an input channel 102 and an output channel 104 that are coupled to a classical computer 106 which, in turn, is in direct two-way communication with a quantum computer 108.

In alternative embodiments, the artificial intelligence system 100 includes a classical computer 106, an input channel 102 and an output channel 104 in communication with the classical computer 106, a quantum computer 108 in two-way communication with the classical computer 106.

The classical computer 106 is configured to direct operations of the quantum computer 108 and may communicate with an external controller having a system clock.

In the present embodiment, a timing of at least one of the classical computer 106 and the quantum computer 108 is coordinated using the system clock of the external controller.

In the present embodiment, the quantum computer 108 is configured to process computations determined difficult for the classical computer 106.

Structure and Configuration

Conventional classical computers, or "Classical Computation Devices" (CC) are well understood and are sufficient tools for many tasks. However, some tasks suffer from combinatorial explosion so extreme that even the fastest conventional classical computers cannot solve them within the estimated age of the universe (approx. 13 billion years).

As such, computations requiring excessive time to process using classical computers are defined as difficult computations. For instance, many problems in computer science require computations on an ordered set of N objects, and sometimes the number of computations is N! (i.e., N factorial). For example, a scenario where N=6 can be computed in 1 second. N=7 will require 7 seconds, and N=8 will require 56 seconds. The required time grows more quickly from there:
N=9, requires 504 seconds
N=10, requires 1.4 hours
N=11, requires 15.4 hours
N=12, requires 7.7 days
N=13, requires 100 days
N=14, requires 3.8 years
N=15, requires 57.6 years
N=16, requires 921 years
N=17, requires 15, 654 years
N=18, requires 281,776 years
N=19, requires 5,353,750 years
Depending on the application, a programmer may be able to accept a computation time of a few seconds or days, but longer times are typically impractical.

In contrast, quantum computers are able to solve a subset of these difficult computations within seconds, even N>20. As such, quantum computers are superior to classical computers when judged on such tasks or computations. This is known as "quantum supremacy," and is the business motivation behind the present general inventive concept. Algorithms such as Shor's algorithm have demonstrated a solid mathematical foundation to this contention.

Figure 3:
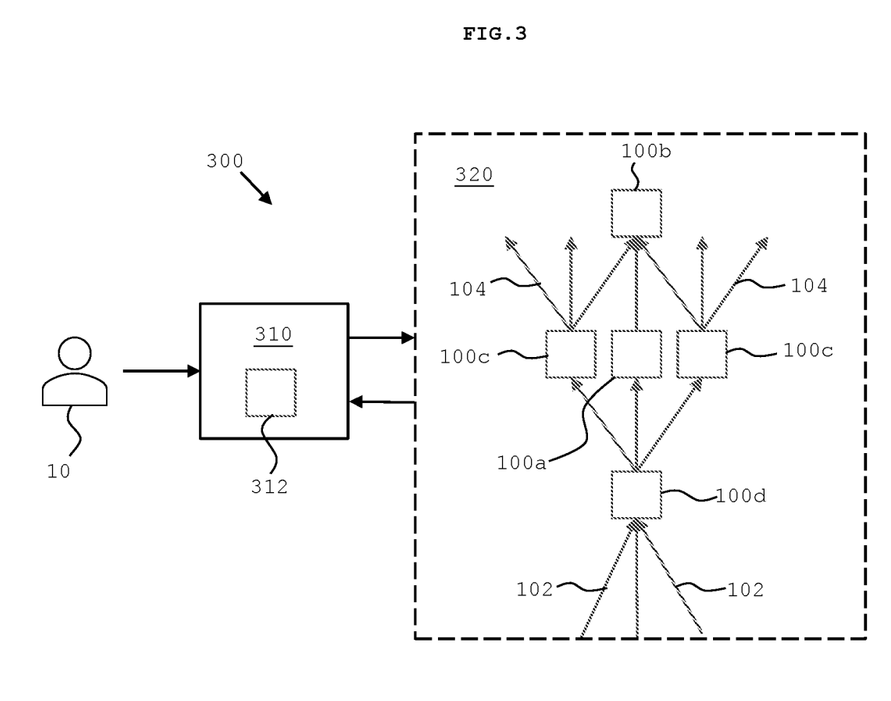
FIG. 3 is a schematic block diagram view of an external system-wide common computer coupled to a network of nodes illustrated in FIG. 2 according to an embodiment of the present general inventive concept.

FIG. 3 is a schematic block diagram view of a plurality of nodes illustrated in FIG. 2 coupled together in a network according to an example embodiment of the present general inventive concept.

The present general inventive concept capitalizes on the strengths of classical computers and quantum computers by providing a unique and novel organization and network structure of combining a classical computer 106 and a quantum computer 108 into a node 100a of an artificial intelligence system 100.

Referring to FIG. 3, in an example embodiment of the present general inventive concept, the artificial intelligence system 300 comprises a top-level classical computer 310 in communication with a network 320 of nodes 100a, 100b, 100c, 100d. The top-level CC 310 may be referred to as a "controller," or a "system-wide classical computer".

In the present embodiment, the artificial intelligence system network 300 includes a plurality of nodes 100 interconnected as a network 320 and a controller 310 in two-communication with the plurality of nodes 100 configured to facilitate a communication between a user 10 and the network 320.

In the present embodiment, each node 100a, 100b, 100c, 100d in the network 320 comprises and encloses a classical computer 106 and a quantum computer 108.

That is, each node 100 of the network 320 includes a classical computer 106 and one or more input channels 102 and one or more output channels 104 in direct communication with the classical computer 106. In the present embodiment, both the input and output channels 102, 104 are configured to send and receive signals.

In the present embodiment, the controller 310 includes a system clock 312 and is programmed by the user 10. The controller 310 configures the classical computer 106 in each node 100. The controller 310 is designed and/or configured to mediate an interaction between the user 10 and the network 320 of nodes 100a, 100b, 100c, 100d. The controller 310 may also mediate an interaction between the network 320 and any other external system. However, the present general inventive concept is not limited thereto.

The classical computer 106 in each node 100 configures the quantum computer 108 in the same node to perform a quantum computation cycle.

In the present embodiment, each node is in communication with the system clock 312 and each node 100 is configured to perform a quantum computation cycle in each timestep including receiving signals processed by the classical computer 106, configuring a quantum circuit by the classical computer 106, the quantum circuit operating on qubits, performing a measure operation on the qubits, transmitting results of the measure operation directly to one or more channels 102, 104.

In alternative embodiments, each node 100 is configured to perform a quantum computation cycle in each timestep, wherein the quantum computation cycle includes the classical computer 106 processing signals from the one or more input channels 102 and the one or more output channels 104. Next, the classical computer 106 configures a quantum circuit (within the quantum computer 108). Then, the quantum circuit operates on the qubits. Next, the quantum computer 108 performs a measure operation on the qubits. Then, the quantum computer 108 sends a result of the measure operation to one or more output channels 104 and/or the classical computer 106 for processing. Next, the classical computer 106 sends signals to at least one input or output channel 102, 104.

In alternative embodiments, the classical computer 106 within at least one node 100 is configured to transmit a first signal through a first channel after a quantum computation cycle, receive a second delta signal through the first channel representing a delta between the first signal and a third expected signal; and alter a state to minimize the second delta signal.

A signal is any set of classical bits. Some channels are designated "input" and others "output" to disambiguate them. This distinction can affect the meaning or timing of a signal, but both types of channels 102, 104 are able to carry signals in both directions (i.e., into and out of the nodes).

This unique and novel organization and structure of the system 300 according to the present general inventive concept allows for the application of a subset of Graph Theory which studies directed graphs. Thus, the system 300 according to the present general inventive concept may be configured in accordance with any arbitrary directed graph.

In an example embodiment, each node 100a, 100b, 100c, 100d comprises the aforementioned input and output channels 102, 104, a classical computer 106, and a quantum computer 108.

The classical computer 106 within each node 100a, 100b, 100c, 100d is designed and/or configured to direct all operations within that node 100a, 100b, 100c, 100d. Further, the classical computer 106 has access to the system clock 312 and can coordinate with the controller 310 as needed.

The quantum computer 106 within each node 100a, 100b, 100c, 100d is designed and/or configured to handle computations that are defined as difficult or near-term impossible for the classical computer 106.

Figure 4:
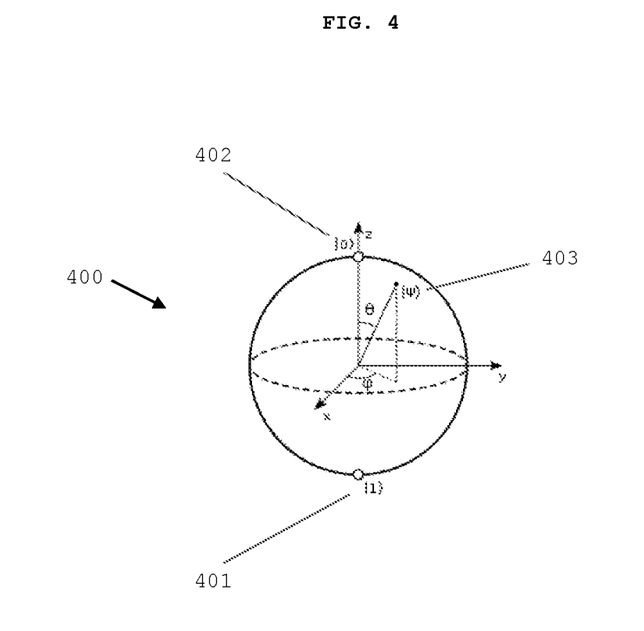
FIG. 4 is a schematic diagram view of a Bloch Sphere representing a state of a qubit.
Figure 5:
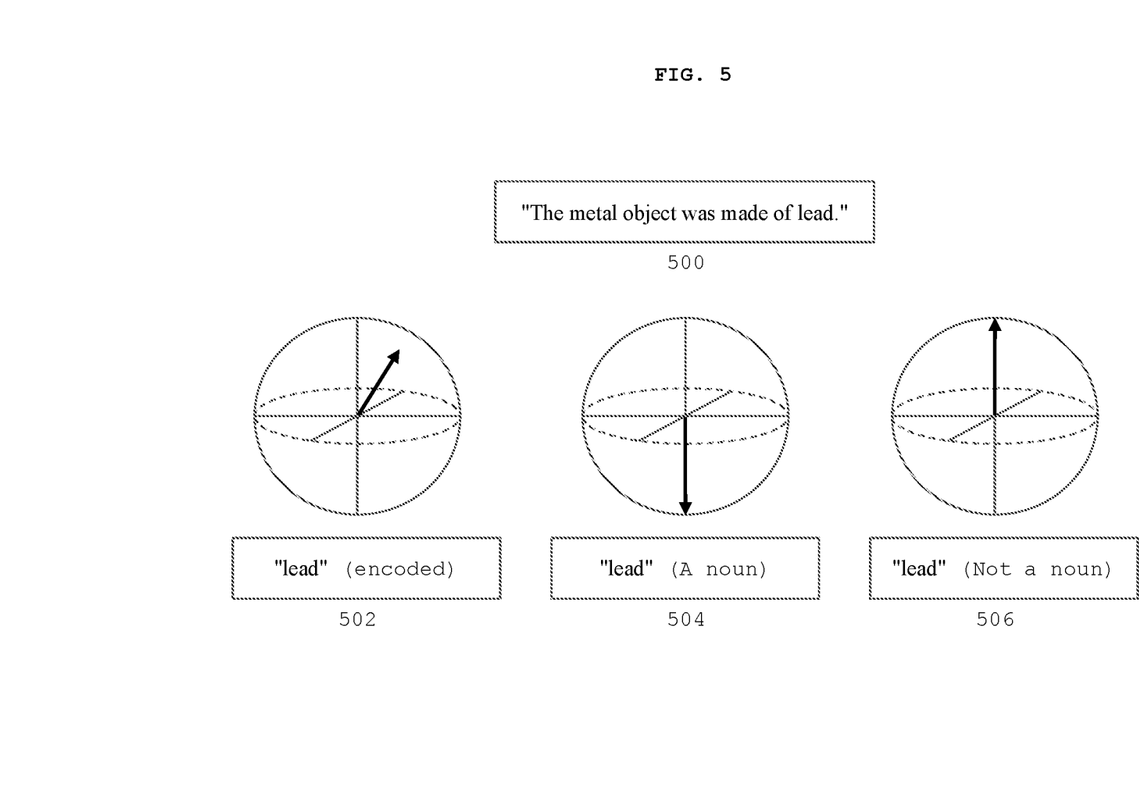
FIG. 5 is a schematic diagram view of an example word "LEAD" encoded in a qubit and corresponding states of variations of the word "LEAD"
Figure 6:
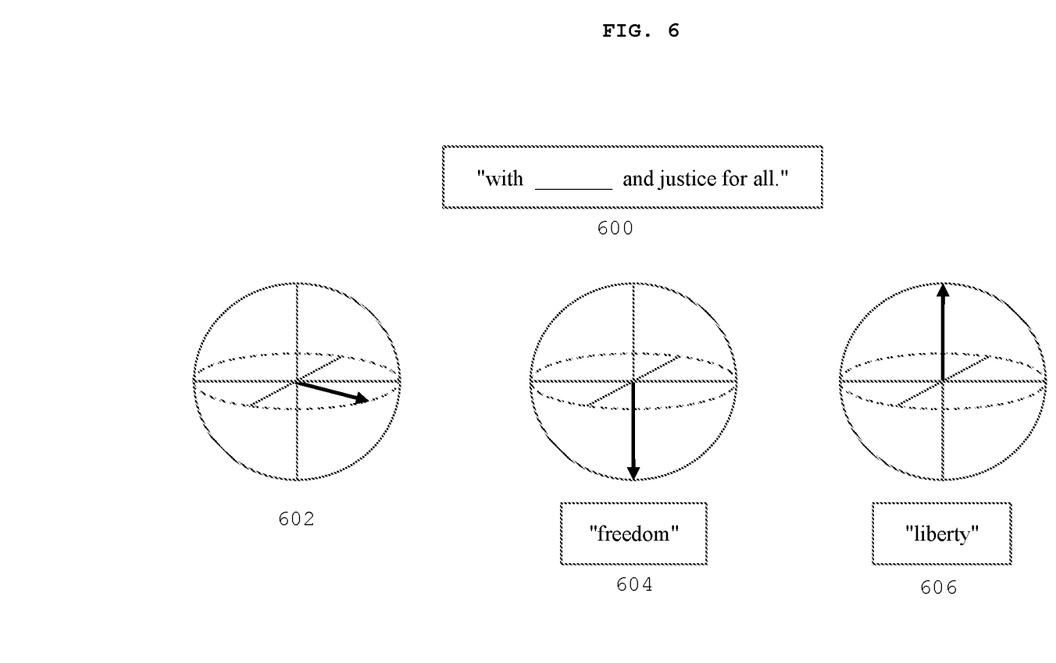
FIG. 6 is a schematic diagram view of Bloch Sphere representations of a method for considering multiple terms for phrase completion according to an example embodiment of the present general inventive concept.

FIG. 4 is a schematic diagram view of a Bloch Sphere representing a state of a qubit, FIG. 5 is a schematic diagram view of how one aspect of a word "LEAD" may be encoded in a qubit and corresponding states of variations of the word "LEAD", and FIG. 6 is a schematic diagram view of Bloch Sphere representations of a method for considering multiple terms for phrase completion according to an example embodiment.

Referring to FIG. 4, the state of a qubit, before measurement, can be represented by a point on this Bloch Sphere 400. There are conditions where the state of a qubit is entangled with another qubit or other qubits. For instance, the state of a qubit may not be known but it may be known that the state of qubit A is the opposite of the state of qubit B, where "opposite" means that whatever state qubit B is in, the state of A can be represented as the state of B with a 180 degree rotation around some specified axis in the Bloch Sphere. The state of a qubit is given by the vector $\Psi$ (403), which may also be expressed by two angles, $\phi$ and $\theta$. Some qubit states in an entangled system will be easier to describe as a linear combination of multiple vectors $\Psi$. After a measure operation, the quantum state will collapse, meaning that the information in $\phi$ and $\theta$ will be lost, leaving only the 0 state (402) or the 1 state (401).

Referring to FIG. 5, given the phrase, "The metal object was made of lead." (500), the system 300 may not have determined yet if "lead" will be considered a noun or not. Both possibilities are allowed by the quantum encoding (502). After a measure operation, the qubit will either collapse to the state where "lead" is treated as a noun (504), or not a noun (506).

Referring to FIG. 6, consider a semi-complete phrase (600) which only requires one more word, represented by a blank. The state of a qubit is used to represent how well two possible words might fit in the blank. In this case, both "freedom" and "liberty" fit equally well. Therefore, the $\theta$ (602) is such that it does not favor 0 (606) nor 1 (604). Both are equally probable. After the measure operation, one of them is selected and used by the system 300 to fill in said blank. This line of reasoning can be extended to natural language generation in general.

Figure 7:
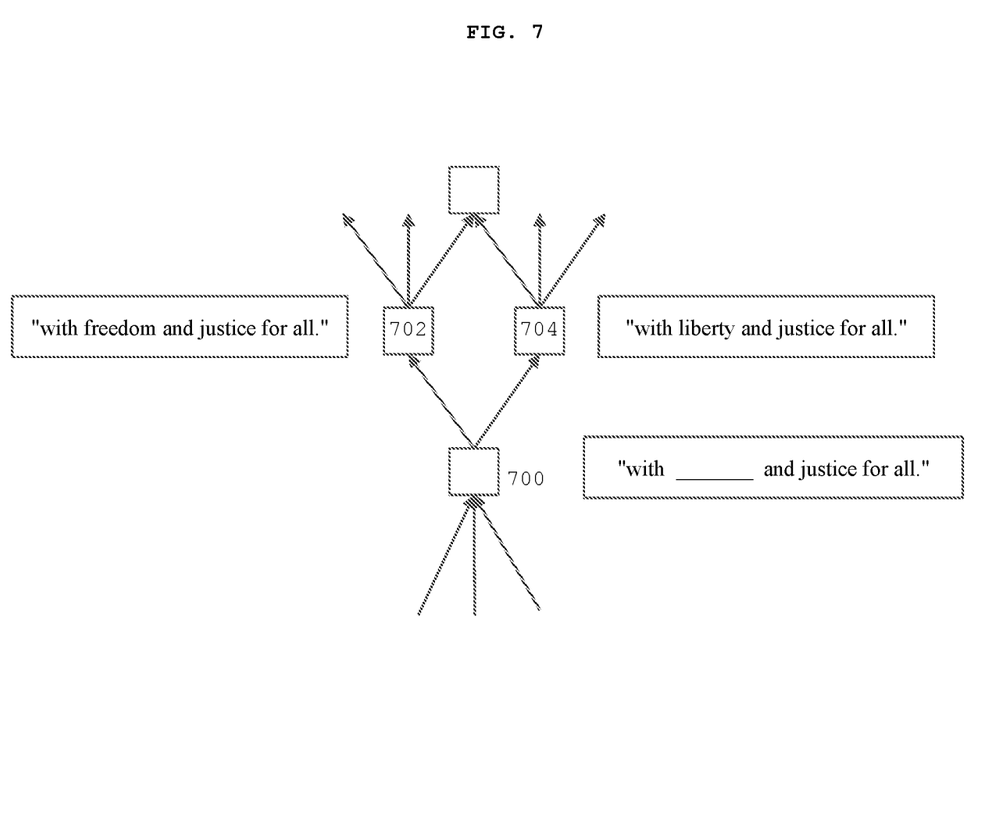
FIG. 7 is a schematic block diagram view of a plurality of nodes illustrated in FIG. 2 coupled together in a parallel network according to another example embodiment of the present general inventive concept.

FIG. 7 is a schematic block diagram view of a plurality of nodes illustrated in FIG. 2 coupled together in a parallel network according to another example embodiment of the present general inventive concept.

Referring to FIG. 7, A node (700) uses its plurality of qubits to represent multiple possibilities for filling in a blank. Out of those possibilities, two are selected and output to downstream nodes. One downstream node (702) will consider the possibility where "freedom" was used to fill in the blank. Another downstream node (704) will consider the possibility where "liberty" was used to fill in the blank. Each of these nodes is then free to consider how such a phrase may interact with other elements (not illustrated).

Operation

Referring to FIG. 3, in the present embodiment, the controller 310 is designed and/or configured to use the system clock 312 to coordinate timing across all nodes 100 in the network 320. Each node 100 operates in cycles. Each cycle includes communication via input and/or output channels 102, 104, some kind of classical computation, and may include some kind of quantum computation. The controller 310 can allow nodes 100 to operate independently or regulate them.

In an alternative embodiment, the controller 310 provides only high-level instructions to the classical computer 106 of each node 100, such as when to begin and end each cycle, the kinds of data to be transmitted via the input and output channels 102, 104, and suggestions for programming changes. In such an embodiment, these light regulations can be optimized such that macroscopic regularities will emerge, similar as those discussed in the body of work known as Complexity Science. Given a sufficiently optimized set of system-wide regulations, patterns will emerge. These patterns will be describable by important information-theoretic statistics such as low entropy, modularity, and fast evolution rates for genetic algorithms. However, the present general inventive concept is not limited thereto.

Modularity will be observed when subsets of the network 320 specialize on one sub-problem. The overall system will evolve more quickly, according to the work of Herbert Simon, if such modules exist.

In an alternative embodiment, the controller 310 configures the system clock 312 and instructs nodes 100a, 100b, 100c, 100d to execute their own cycles in such a way that subsets of the nodes 100 are in sync with each other. Outside of such a subset, any downstream node 100 would be configured to execute its cycle just afterward so that it may benefit from the output of upstream nodes 100. For instance, in FIG. 3, node 100c is considered downstream to node 100d.

In the present embodiment, each node 100 executes a cycle during its prescribed time span, where this cycle is mediated by the node's classical computer 106. The cycle begins with the classical computer 106 reading any received signals, whether they come from the input or the output channels 102, 104. The classical computer 106 processes this data and may use the data to configure the node's quantum computer 108. Next, the quantum computer 108 executes a full quantum computation, which includes the application of a set of quantum gates to its qubits, and then a measure operation. The output of the measure operation provides a set of classical bits which the classical computer 106 may process and/or send via either the input or the output channels 102, 104.

Improvement

In the same way that computer scientists utilize a collection of methods known as "machine learning" for the purpose of configuring a classical computer such that it performs an optimized function, the artificial intelligence system 300 according to present general inventive concept will also reconfigure itself to optimize a function.

The function to be optimized may be arbitrary. In the present embodiment, this function is represented by and presented to the artificial intelligence system 300 as a set of input-output pairs. Each pair comprises some set of classical bits that represent an input signal and set of classical bits that represents an expected output signal. The signals may also be analog instead of digital. It is not important that they be digital, but for the preferred embodiment, these signals will be digital. However, the present general inventive concept is not limited thereto.

Figure 8:
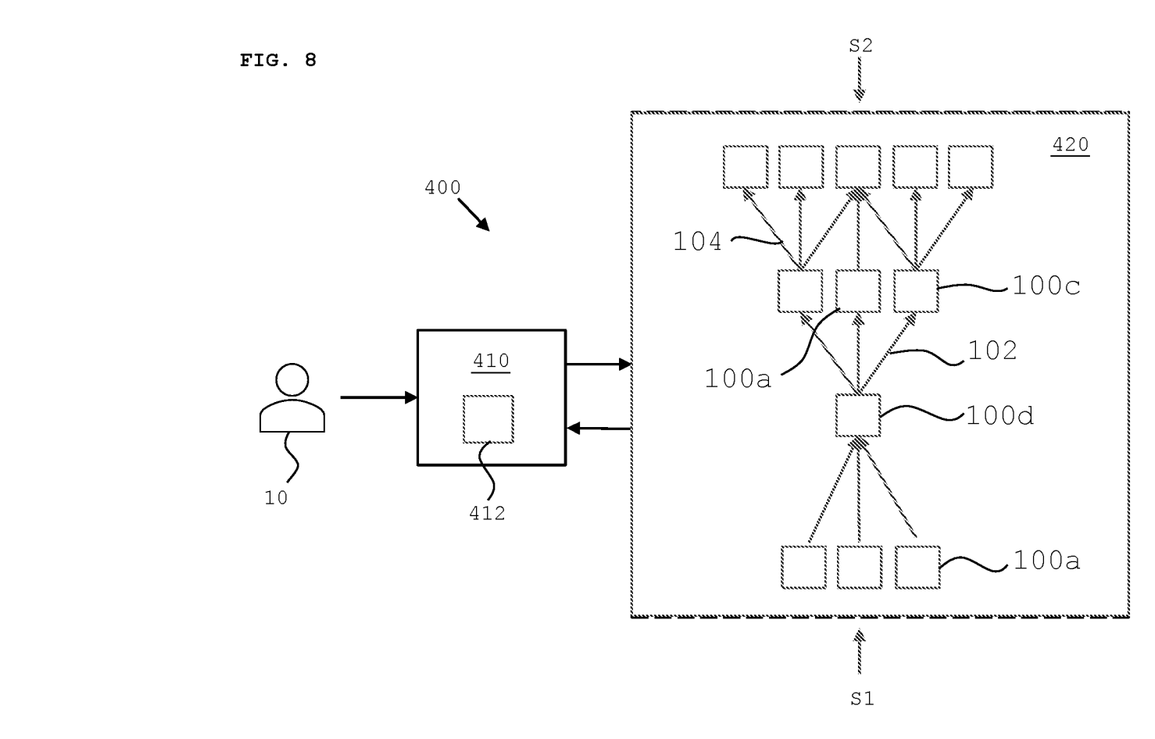
FIG. 8 is a schematic block diagram view of artificial intelligence system according to another embodiment of the present general inventive concept.

FIG. 8 is a schematic block diagram view of an artificial intelligence system 400 according to another embodiment of the present general inventive concept.

In the present embodiment, the artificial intelligence system network 400 includes a plurality of nodes 100 interconnected as a network 420 and a controller 410 in two-communication with the plurality of nodes 100 configured to facilitate a communication between a user 10 and the network 420.

In the present embodiment, each node 100a, 100b, 100c, 100d in the network 420 comprises and encloses a classical computer 106 and a quantum computer 108.

That is, each node 100 of the network 420 includes a classical computer 106, and one or more input channels 102 and one or more output channels 104 in direct communication with the classical computer 106. In the present embodiment, both the input and output channels 102, 104 are configured to send and receive signals.

In the present embodiment, the controller 410 includes a system clock 412 and is programmed by the user 10. The controller 410 configures the classical computer 106 in each node 100. The controller 410 is designed and/or configured to mediate an interaction between the user 10 and the network 420 of nodes 100a, 100b, 100c, 100d. The controller 410 may also mediate an interaction between the network 320 and any other external system. However, the present general inventive concept is not limited thereto.

In the present example embodiment, defining (S1, S2) to refer to an input-output pair, wherein S2 represents a real or expected outcome S2 in a scenario where S1 was chosen or observed first.

The artificial intelligence system 400 according to the present general inventive concept is designed and/or configured to execute a set of cycles in which a plurality of nodes 100 will take in input and generate outputs. Most of the nodes 100 will only interact locally with other nodes 100, but some nodes 100 will be able to interact externally, being mediated by the controller 410.

Let "output layer" refer to those nodes 100 which will generate the final system output. The controller 410 will make S2 available to the output layer. The output layer will then be able to reconfigure itself such that given S1 again, the system output will better approximate S2. The output layer can take its local differential (difference between its actual output and S2) and generate a signal to be sent back to its upstream nodes.

This method of system-wide alteration is well-known in computer science. Back-propagation is the most common term for this action, but "back-propagation" is a mathematical algorithm which is narrowly defined. The preferred embodiment of the artificial intelligence system 400 according to the present general inventive concept may use this method but is not limited by the precise definition as it is currently practiced. Further, the present general inventive concept is not limited to this method.

In the present embodiment, each node of the plurality of nodes is configured to use bits to represent vectors in both the state spaces U of upstream nodes and the state spaces D of the downstream nodes. Further, each node of the plurality of nodes is configured to use bits to represent a current state $d \in D$ of any downstream node, and the current state $u \in U$ of any upstream node.

In the present embodiment, each node of the plurality of nodes is configured to use bits to represent a set of functions $f:(u,d) \rightarrow d'$, where $d' \in D$. Further, each node of the plurality of nodes can configure the quantum computer such that at least one possible value of d' can be represented in qubits by using values of u and d as inputs to $f$.

Each node of the plurality of nodes can also execute a measure operation on the qubits such that a single d' can be output for any downstream node, wherein the state spaces U and D include graph spaces.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An artificial intelligence node, comprising:
a classical computer;
an input channel and an output channel in communication with the classical computer; and
a quantum computer in two-way communication with the classical computer,
wherein the classical computer configures the quantum computer to perform a quantum computational cycle and wherein the classical computer is configured to transmit a first signal after a computational cycle, receive a second delta signal representing a delta between the first signal and a third expected signal and alter a state to minimize the second delta signal.

2. The artificial intelligence node of claim 1, wherein the classical computer is configured to direct operations of the quantum computer.

3. The artificial intelligence node of claim 2, wherein the classical computer is configured to communicate with an external controller having a system clock.

4. The artificial intelligence node of claim 3, wherein a timing of at least one of the classical computer and the quantum computer is coordinated using the system clock of the external controller.

5. The artificial intelligence node of claim 4, wherein the quantum computer is configured to process computations determined difficult for the classical computer.

6. An artificial intelligence system network, comprising:
a plurality of nodes interconnected as a network, wherein each node comprising:
a classical computer;
one or more input channels and one or more output channels in communication with the classical computer, both the input and output channels configured to send and receive signals;
a quantum computer in two-way communication with the classical computer; and
a controller in two-way communication with the network and configured to facilitate a communication between a user and the network,
wherein the classical computer configures the quantum computer to perform a quantum computational cycles and wherein the classical computer within at least one node is configured to transmit a first signal through a first channel after a quantum computation cycle, receive and second delta signal through the first channel representing a delta between the first signal and a third expected signal and alter a state to minimize the second delta signal.

7. The artificial intelligence system network of claim 6, wherein the controller includes a system clock.

8. The artificial intelligence system network of claim 7, wherein each node is in communication with the system clock.

9. The artificial intelligence system network of claim 8, wherein each node is configured to perform a quantum computation cycle in each timestep including receiving signals processed by the classical computer, configuring a quantum circuit by the classical computer, the quantum circuit operating on qubits, performing a measure operation on the qubits, transmitting result of the measure operation directly to the one or more output channels.

10. The artificial intelligence system of claim 6, wherein each node is configured to perform a quantum computation cycle in each timestep, the quantum computation cycle comprising:

the classical computer processing signals from the one or more input channels and the one or more output channels;
the classical computer configuring a quantum circuit;
the quantum circuit operating on the qubits;
the quantum computer performing a measure operation on the qubits,
the quantum computer sending a result of the measure operation to one of the one or more output channels and the classical computer for processing, and
the classical computer sending signals to at least one of the one or more input channels and the one or more output channels.

11. The artificial intelligence system of claim 6, wherein each node of the plurality of nodes is configured to use bits to represent vectors in both the state spaces U of upstream nodes and the state spaces D of the downstream nodes.

12. The artificial intelligence system of claim 11, wherein each node of the plurality of nodes is configured to use bits to represent a current state $d \in D$ of any downstream node, and the current state $u \in U$ of any upstream node.

13. The artificial intelligence system of claim 12, wherein each node of the plurality of nodes is configured to use bits to represent a set of functions $f:(u,d) \rightarrow d'$, where $d' \in D$.

14. The artificial intelligence system of claim 13, wherein each node of the plurality of nodes can configure the quantum computer such that at least one possible value of d' can be represented in qubits by using values of u and d as inputs to $f$.

15. The artificial intelligence system of claim 13, wherein each node of the plurality of nodes can execute a measure operation on the qubits such that a single d' can be output for any downstream node.

16. The artificial intelligence system of claim 15, wherein the state spaces U and D include graph spaces.

17. A computer-implemented method, comprising;
forming a network of a plurality of interconnected nodes, wherein each node comprises a classical computer, one or more input channels and one or more output channels in communication with the classical computer, wherein both the input and output channels configured to send and receive signals, and a quantum computer in two-communication with the classical computer, wherein the classical computer configures the quantum computer to perform a quantum computation cycle;
computing an importance, using the classical computer, of each input channel using a plurality of methods including ablation and correlation;
attenuating, using the classical computer, each input channel determined less important;
amplifying, using the classical computer, each input channel determined more important; and
disconnecting, using the classical computer, each input channel below a predetermined level of importance.

18. The method of claim 17, wherein for a given node X, when all of node X's outputs have been disconnected by nodes downstream of node X or fall below a predetermined threshold of importance, node X disconnects from the network.

19. A method of improving an artificial intelligence system, the artificial intelligence system comprising a plurality of nodes interconnected as a network, wherein each node includes a classical computer, one or more input channels and one or more output channels in communication with the classical computer, both the input and output channels configured to send and receive signals, a quantum computer in two-way communication with the classical computer, and a controller in two-way communication with the network and configured to facilitate a communication between a user and the network, wherein the classical computer configures the quantum computer to perform a quantum computational cycle, the method comprising:
- finding, using the controller, a set N of distinct unconnected nodes having output channels with correlated signals;
- connecting, using the controller, the set N nodes to afford intercommunication; and
- altering, by each node in the set N nodes, the classical computer internal to the node according to a goal comprising:
  - minimizing a number of duplicate computations;
  - maximizing signal robustness; and
  - maximizing coding efficiency.

* * * * *